July 9, 1929.  O. C. TRAVER  1,719,912

CIRCUIT PROTECTION

Filed April 5, 1926

Inventor:
Oliver C. Traver,
by
His Attorney

Patented July 9, 1929.

1,719,912

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

CIRCUIT PROTECTION.

Application filed April 5, 1926. Serial No. 99,911.

My invention relates to circuit protection, and more particularly to improvements in protective systems and apparatus for controlling electric circuits on the occurrence of abnormal conditions whereby to provide reliability and sensitivity of operation on the occurrence of ground faults, particularly on electric systems having a neutral point grounded through a current limiting device of relatively high impedance.

My invention will be better understood from the following description taken in connection with the accompanying drawing, and its scope will be pointed out in the appended claims.

Figure 1:
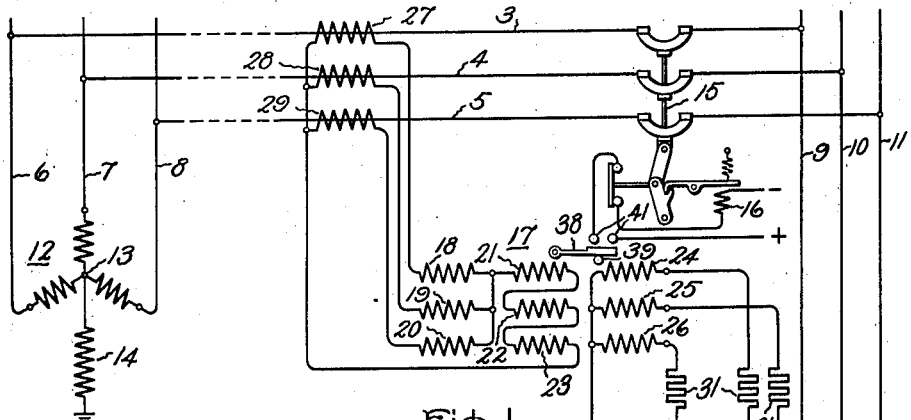
Figure 2:
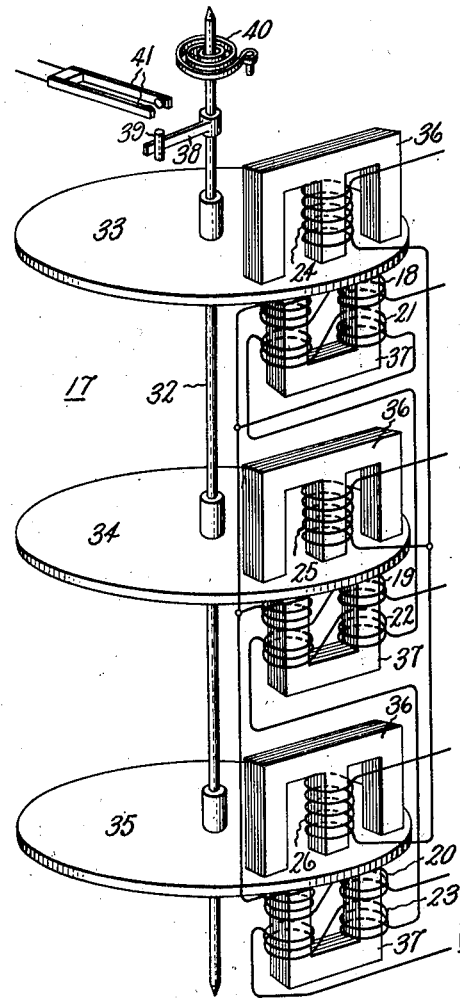

In the accompanying drawing, Fig. 1 illustrates diagrammatically part of an electric system provided with electric circuit protective apparatus embodying my invention, and Fig. 2 illustrates in perspective a part of the protective apparatus which is diagrammatically illustrated in Fig. 1.

In Fig. 1, an electric circuit, such as one of two parallel three-phase feeders comprising phase conductors 3, 4, 5, interconnects a bus 6, 7, 8 at one station of an electric system and a bus 9, 10, 11 at another station of the system. A portion of each of the conductors 3, 4, 5 is shown in broken line merely to give a conception of distance between the stations. The station having the bus 6, 7, 8 may be a generating station having a source such as a generator 12, whose neutral point 13 is grounded through a suitable current limiting device 14, which may have relatively high impedance. This device may be a resistor.

For controlling the circuit 3, 4, 5 at one of the stations such as the station which has the bus 9, 10, 11 and which may be a distributing station, I provide suitable circuit interrupting means such as a circuit breaker 15 having a trip coil 16 which is arranged to be controlled by protective apparatus embodying my invention.

This apparatus comprises an electroresponsive device herein shown, for the purpose of illustrating my invention, as a polyphase directional relay 17 comprising windings 18, 19, 20 connected to be energized respectively in acccordance with the currents in the conductors 3, 4, 5; windings 21, 22, 23 connected to be energized in accordance with the vector sum of the currents in the conductors 3, 4, 5; and windings 24, 25, 26 connected to be energized respectively in accordance with the potentials to ground of the conductors 5, 3, 4. The current windings 18, 19, 20 as shown are connected in series relation with the conductors 3, 4, 5 through the secondaries of current transformers 27, 28, 29, respectively. The current transformer secondaries are connected together at corresponding ends, as are also the current windings 18, 19, 20, and between these end connections the windings 21, 22, 23 are connected in series. The windings 21, 22, 23 are, therefore, energized in accordance with the vector sum of the currents in the phase conductors 3, 4, 5; that is, in accordance with the residual current of the circuit. This residual current is normally substantially zero, but on the occurrence of a fault to ground assumes a value dependent on the severity of the fault and the impedance of the current limiting device 14. The potential windings 24, 25, 26 may be connected to the bus 9, 10, 11 through a star-star connected potential transformer 30 having the neutral point of its primary windings grounded. Suitable phase displacing means such as resistors 31 connected in circuit with the windings 24, 25, 26 may be provided.

The electroresponsive device 17 may further take the form of an induction disc polyphase relay comprising a movable member such as a shaft 32 on which are mounted for simultaneous movement discs 33, 34, 35. The shaft 32 is arranged to be rotated by electromagnetic means such as motor elements comprising magnetic members 36, 37, between the poles of which the discs are mounted. The magnetic members 36 associated with the discs are energized by the potential windings 24, 25, 26, respectively, while the magnetic members 37 are energized by both the current windings 18, 19, 20, respectively, and the residual current windings 21, 22, 23, respectively. The current windings 18 and 21, 19 and 22, and 20 and 23 are so arranged on the respective magnetic members 37 and so connected in series relation with the conductors 3, 4, 5 as to assist electromagnetically when a fault to ground occurs on the respective conductors and the direction of power is reversed. Thus with a fault to ground on the conductor 3, the current windings 18 and 21 cooperate with the potential winding 24 so as to tend to turn the disc 33 and the shaft 32 in a direction dependent on the direction of the fault, that is relatively to the location of the relay. With a fault to ground on the conductor 4, the current windings 19 and 22 similarly cooperate with the potential winding 25. With a fault to ground on the conductor 5, the current windings 20 and 23 similarly cooperate with the potential winding 26.

If $E_3$, $E_4$, $E_5$ and $I_3$, $I_4$, $I_5$ represent, respectively, the potentials to ground of and the currents in the respective conductors 3, 4, 5, and $I_r$ the residual current of the circuit of these conductors, then the torques on the respective discs 33, 34, 35 are proportional to:

$$E_5(I_3+I_r)$$
$$E_3(I_4+I_r)$$
$$E_4(I_5+I_r)$$

The resultant torque on the movable member 32 tending to turn the contact operating member 38 in a direction dependent on circuit conditions is the algebraic sum of these separate torques and may be expressed as the algebraic sum of four torques which are respectively proportional to $I_3 E_5$, $I_4 E_3$, $I_5 E_4$, and $I_r(E_3+E_4+E_5)$. The first three of these torques constitute the polyphase power torque, while the fourth or last constitutes the residual current torque.

Assuming normal conditions with the directions of power from bus 6, 7, 8 to bus 9, 10, 11, the residual current coils 21, 22, 23 are not energized and the relay 17 operates as a polyphase power directional relay, the resultant polyphase torque being such as to turn the contact operating member against a stop 39. This polyphase torque may be assisted by suitable biasing means, such as a spring 40.

On the occurrence of an interphase fault such as a short-circuit between two of the conductors 3, 4, 5 anywhere in the zone between the bus 6, 7, 8 and the bus 9, 10, 11, a reversal of power may occur in the circuit 3, 4, 5 at the location of the relay 17 if the system is such that the fault can be fed from either a feeder in parallel to the feeder circuit 3, 4, 5, or a source elsewhere on the system, but connected to the bus 9, 10, 11. In this case, assuming no ground current, that is, the residual current of the circuit substantially zero, the relay 17 operates selectively in accordance with the direction of power as a polyphase power directional relay, and effects the opening of the circuit breaker 15, since the direction of the polyphase power torque is reversed.

On the occurrence of a fault to ground on one of the conductors 3, 4, 5 such as conductor 3, in the zone between the bus 6, 7, 8 and the location of the relay 17, the load current in the conductors 3, 4, 5 may exceed the fault current because of high resistance in the fault and/or a high impedance in the current limiting device 14, which is sometimes purposely designed to limit the ground current to a value less than the normal load current. In this case, the direction of the polyphase torque is such as to tend to hold the circuit controlling member 38 against the stop 39. The residual current windings 21, 22, 23 are, however, energized and in cooperation with the potential windings 24, 25, 26 provide the residual torque which is opposed to and greater than the polyphase torque. Consequently, the circuit controlling member 38 is moved in a direction to close the contacts 41 and thereby to complete the circuit of the trip coil 16, thus effecting the opening of the circuit breaker 15. If the system were subjected to a ground fault on some other feeder coming into the bus 9, 10, 11, then there would be no reversal of power at the relay location. In this case, both the polyphase torque and the residual current torque would be in the same direction and would tend to hold the circuit controlling member 38 against the stop 39. Service, therefore, would not be interrupted on the circuit 3, 4, 5 by the relay 17.

While I have shown and described my invention in considerable detail, I do not desire to be limited to the exact arrangement shown, but seek to cover in the appended claims all those modifications that fall within the spirit and scope of my invention.

What I claim as new, and desire to secure by Letters Patent of the United States, is:

1. In combination with an electric circuit having a grounded neutral point, circuit controlling means including a relay having a winding connected to be energized in accordance with the current in a conductor of the circuit, a winding connected to be energized in accordance with the residual current of the circuit, and a cooperating winding connected to be energized in accordance with the potential to ground of another conductor of the circuit.

2. An electric circuit and circuit controlling means therefor including a relay having a winding connected to be energized in accordance with the current in a conductor of the circuit, a winding connected to be energized in accordance with the vector sum of the currents in the conductors of the circuit, and a cooperating winding connected to be energized in accordance with a potential of the circuit.

3. In combination with an electric circuit, a relay comprising a movable member and actuating means therefor including a plurality of cooperating windings connected and arranged to control the member in accordance with the product $E(I+I_r)$ where $E$ represents the potential to ground of one conductor of the circuit, $I$ the current in another conductor of the circuit, and $I_r$ the vector sum of the currents in the conductors of the circuit.

4. In combination with an electric circuit, a relay including a movable member and actuating means therefor including a plurality of cooperating windings connected and arranged to control the member in accordance with the product $E(I+I_r)$ where E represents a potential of the circuit, I the current in one of the conductors of the circuit, and $I_r$ the vector sum of the currents in the conductors of the circuit.

5. In combination with a polyphase electric circuit, a relay including a rotatably mounted member and means for actuating the member comprising a plurality of motor elements, one for each phase conductor of the circuit, each element having a plurality of cooperating windings respectively connected to be energized in accordance with the current in the associated conductor, the potential to ground of another conductor and the residual current of the circuit.

6. In combination with a polyphase electric circuit, a polyphase power directional relay including a plurality of simultaneously rotatable discs and a plurality of electromagnetic motor elements, one for each disc, characterized by the fact that each of said elements is provided with a winding connected to be energized in accordance with the residual current of the circuit.

7. Electric circuit protective apparatus including a power directional relay having cooperating current and potential windings characterized by the fact that a winding arranged to cooperate with said current and potential windings and connected to be energized in accordance with the residual current of the circuit is provided.

8. Electric circuit protective apparatus including a relay having a rotatably mounted member and means for exerting thereon a torque substantially proportional to the product of a potential of the circuit and the vector sum of the current in a conductor of the circuit and the residual current of the circuit.

9. Electric circuit protective apparatus including a movable member and electromagnetic means for actuating the member including a plurality of cooperating current and potential windings connected and arranged to exert on the member an effect substantially proportional to the product of a potential of the circuit and the vector sum of the current in a conductor of the circuit and the residual current of the circuit.

10. Electric circuit protective apparatus including a movable member and electromagnetic means for exerting thereon a force substantially proportional to the product of the potential to ground of one conductor of the circuit and the vector sum of the current in another conductor of the circuit and the residual current of the circuit.

11. Electric circuit protective apparatus including a directional relay having a rotatably mounted member and electromagnetic actuating means therefor including a winding connected to be energized in accordance with the potential to ground of only one conductor of the circuit and means cooperating with the potential winding whereby to turn the member selectively in accordance with the direction of a fault on the circuit including a winding connected to be energized in accordance with the residual current of the circuit.

12. Electric circuit protective apparatus including a movable member and actuating means therefor including a winding connected to be energized in accordance with the current in a conductor of the circuit and a cooperating winding connected to be energized in accordance with the residual current of the circuit.

13. Electric circuit protective apparatus including a relay having a movable member and electromagnetic actuating means therefor including a winding connected to be energized in accordance with the potential to ground of only one conductor of the circuit, and means cooperating with the potential winding whereby to turn the member selectively in accordance with the direction of a fault to ground on a conductor of the circuit including a winding connected to be energized in accordance with the residual current of the circuit.

14. In combination with an electric circuit a relay having a rotatably mounted member and a motor element for actuating said member including a winding connected to be energized in accordance with the current in a conductor of the circuit and a winding connected to be energized in accordance with the residual current of the circuit, said windings being arranged electromagnetically to cooperate on the occurrence of a fault to ground on the circuit.

In witness whereof, I have hereunto set my hand this 2nd day of April, 1926.

OLIVER C. TRAVER.